June 10, 1952    H. ROMEYN, JR., ET AL    2,600,024
ELASTOMER PRODUCT

Filed May 4, 1950    3 Sheets-Sheet 1

RUBBERY BUTADIENE-ACRYLONITRILE
COPOLYMER HAVING

1. METHYL ETHYL KETONE-INSOLUBLE
   GEL CONTENT FROM 40 TO 100 %,
   PREFERABLY FROM 50 TO 75 %

2. SWELLING INDEX OF GEL, MEASURED IN
   METHYL ETHYL KETONE, FROM 8 TO 35,
   PREFERABLY FROM 10 TO 25

3. MOONEY VISCOSITY AT 212°F. FROM 40 TO 80,
   PREFERABLY FROM 45 TO 75

Fig. 1

INVENTORS
HENDRIK ROMEYN, Jr.
JOHN F. PETRAS
BY Robert J. Patterson
ATTORNEY

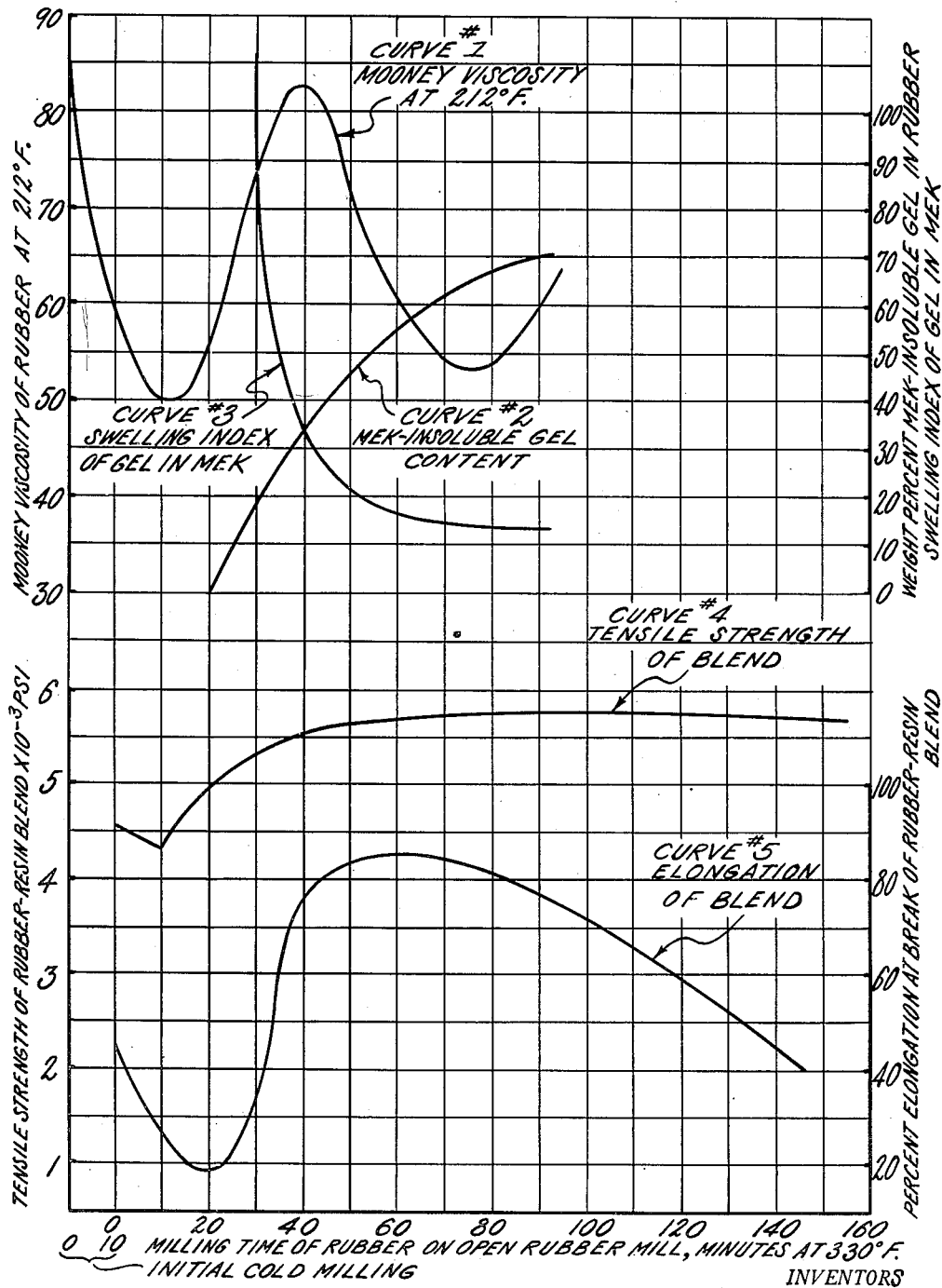

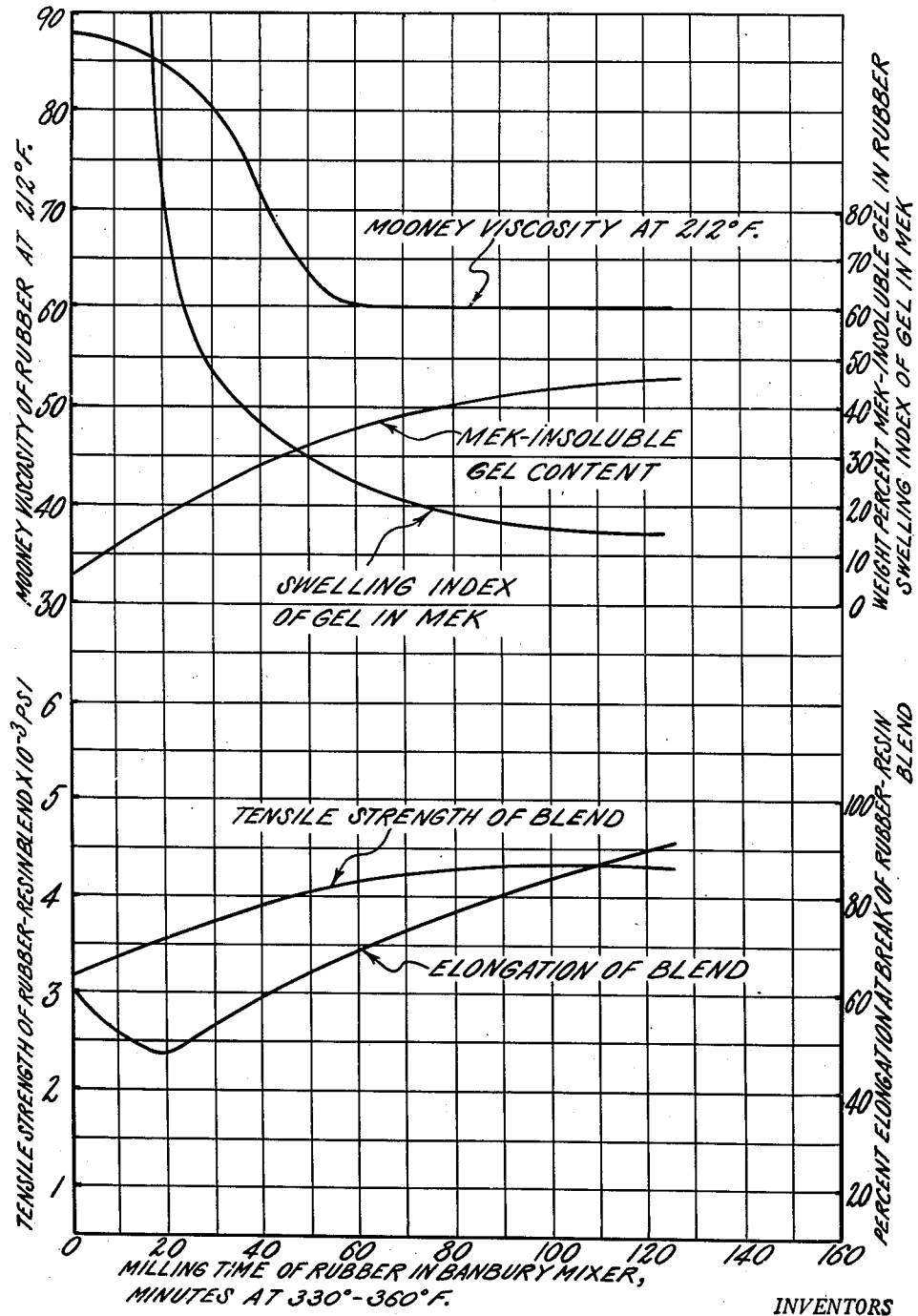

Patented June 10, 1952

2,600,024

UNITED STATES PATENT OFFICE 2,600,024

ELASTOMER PRODUCT

Hendrik Romeyn, Jr., Montclair, and John F. Petras, Passaic, N. J., assignors to United States Rubber Company, New York, N. Y., a corporation of New Jersey Application May 4, 1950, Serial No. 159,942

15 Claims. (Cl. 260—45.5)

This invention relates to an improved butadiene-acrylonitrile rubbery copolymer having substantially improved processing characteristics and to compositions comprising this improved elastomer and a thermoplastic resin. The invention also relates to a simple method of making the improved butadiene-acrylonitrile rubbery copolymer of our invention from ordinary butadiene-acrylonitrile rubbery copolymer.

One of the difficulties which has been encountered in the past in utilizing butadiene-acrylonitrile rubbery copolymers has been that such copolymers have been excessively nervy and gristly. As a result it has been deemed essential to subject such rubbery copolymers to a prolonged break-down on a cold mill and to incorporate therewith substantial amounts of plasticizers or processing aids in order to make them smooth and processible. The intractable characteristic of the rubbery copolymers is manifested when it is attempted to mix them with thermoplastic resinous materials, resulting in difficulty of incorporation and roughness in the finished compositions.

We have discovered a new type of butadiene-acrylonitrile rubbery copolymer which avoids the disadvantages of butadiene-acrylonitrile rubbery copolymers heretofore available. Our new butadiene-acrylonitrile rubbery copolymer is characterized by having a methyl ethyl ketone-insoluble gel content ranging from 40% upwardly to 100%, this gel having a swelling index of from 8 to 35 determined in methyl ethyl ketone, and a Mooney viscosity of from 40 to 80 at 212° F. Our invention is based upon the discovery that rubbery butadiene-acrylonitrile copolymers having these characteristics exhibit greatly improved processing properties and much lower shrinkage, and blend much more smoothly and easily with thermoplastic resins to give compositions free from surface roughness and having greatly improved physical characteristics.

The methyl ethyl ketone-insoluble gel content of a butadiene-acrylonitrile rubbery copolymer can be determined by extracting at room temperature in the dark for 24 hours thin strips of the rubbery copolymer with peroxide-free methyl ethyl ketone, which dissolves the sol portion of the rubber, leaving the gel undissolved. That portion of the methyl ethyl ketone-insoluble gel which cannot be changed by milling (either in the cold or at elevated temperature) to a form in which it is soluble in cold methyl ethyl ketone is herein referred to for convenience as "tight" gel. Tight gel is further characterized in that it has a relatively low swelling index, measured in peroxide-free methyl ethyl ketone.

The gel with which the present invention is concerned is tight methyl ethyl ketone-insoluble gel. The levels of such gel contemplated by the present invention are to be distinguished from the levels of toluene-insoluble "B" gel contemplated in the copending application of Lawrence E. Daly, Serial No. 59,779, now U. S. Patent 2,550,139. Daly measures the content of gel which is insoluble in toluene whereas the present inventors measure the content of gel which is insoluble in methyl ethyl ketone. These two solvents exhibit entirely different solvent action upon the materials in question. Therefore the difference in solvents used to determine gel is very important. When butadiene-acrylonitrile rubber is masticated at temperatures ranging from about 300° F. upwardly, there is a definite correlation between the building up of toluene-insoluble "B" gel and tight methyl ethyl ketone-insoluble gel. For example, when a conventional butadiene-acrylonitrile rubbery copolymer such as "Paracril 35NS90" is ground on the mill at 300° F., at the time when the toluene-insoluble "B" gel level has reached 50%, the tight methyl ethyl ketone-insoluble level will only be about 24%; when the tight methyl ethyl ketone-insoluble gel content has reached 40%, the toluene-insoluble "B" gel level will be around 66% which is considerably in excess of the upper value specified in the aforementioned Daly application.

The nature of the methyl ethyl ketone-insoluble gel in the improved butadiene-acrylonitrile rubbery copolymer of our invention can be determined by measuring the swelling index of the gel in peroxide-free methyl ethyl ketone. The swelling index is defined as the ratio of the weight of the gel sample when it is swollen with methyl ethyl ketone (as it will be at the conclusion of the solvent extraction referred to previously) to the weight of the gel sample after the methyl ethyl ketone has been evaporated therefrom. The swelling index of "loose" gel (which differs from tight gel in that it is rendered soluble by cold or hot mastication) is relatively high, commonly ranging from 100 upwardly, while the swelling index of tight gel is low, not exceeding 35. Thus, the swelling index is a measure of the type of gel present. The lower the swelling index, the tighter the gel, since the more nearly it approaches complete insolubility in methyl ethyl ketone or other solvents for the gel portion of the rubbery copolymer. Swelling indices less than 35 and particularly those which are less than 25 indicate complete or nearly complete absence of loose gel in the methyl ethyl ketone-insoluble portion of the rubbery copolymer.

The specified ranges for gel content, gel swelling index and Mooney viscosity are critical and it is essential that they be observed. If any one of the three specified properties of the rubbery copolymer falls outside the ranges specified for that particular property, the processing characteristics or physical properties of the resulting copolymer or of the blends thereof with thermoplastic resins are seriously impaired in one or more respects. For example, if the methyl ethyl ketone-insoluble gel content is below 40%, the product has poor processing characteristics, is rough, and exhibits high shrinkage. If the swelling index is greater than 35, the processing characteristics are impaired; this is attributed to the presence of substantial amounts of loose gel which is undesirable from the standpoint of processability. We prefer that no substantial amount (not over 5% of the copolymer) of loose gel be present.

If the Mooney viscosity is lower than 40, processing characteristics are satisfactory but the physical properties of the rubbery copolymer and of the blends with thermoplastic resins are seriously impaired. Thus, the hardness, flexural strength, and modulus of the resulting blends are objectionably reduced. In addition, rubbery copolymers having a Mooney viscosity below 40 are so soft that storage, shipping and handling are difficult because of the extreme tendency of the material to flow together upon standing for a short time. If the Mooney viscosity is materially above 80, either some physical properties, or the processability, or both, may be poor.

Optimum results are achieved when the methyl ethyl ketone-insoluble gel content of the rubbery copolymer ranges from 50 to 75%, the swelling index ranges from 10 to 25, and the Mooney viscosity ranges from 45 to 75. Accordingly butadiene-acrylonitrile rubbery copolymers having properties within these ranges are preferred.

The rubbery butadiene-acrylonitrile copolymers of our invention will usually contain from 15 to 45 weight percent of combined acrylonitrile and more commonly from 20 to 40 weight percent of combined acrylonitrile. The practical limits for combined acrylonitrile content may vary with the method used in producing the copolymer of our invention. For example, when this copolymer is made by hot-milling, in the manner described in detail below, the acrylonitrile content will range from 20 to 45 weight percent and preferably between 25 and 40 weight percent. In the case of a rubbery copolymer made directly by emulsion polymerization in the manner described hereinafter, the practical lower limit for the acrylonitrile content may be somewhat lower than for the hot-milling process, and may be as low as 15 weight percent.

The balance of the rubbery copolymer of our invention is mainly or entirely butadiene. As will appear more fully hereinafter, when the rubbery copolymer of our invention is made directly by an emulsion polymerization procedure it may contain up to a few percent of a cross-linking monomer. This cross-linking monomer is a bi-functional compound having two polymerizable groups which are capable of joining or cross-linking molecular groups to form a cross-linked or gel structure. The cross-linking agent is used in such an amount and in such a way as to give a product having at least 40% of methyl ethyl ketone-insoluble gel and otherwise conforming to our invention but not in an amount such as to yield a product which is so highly cross-linked that it is no longer rubber-like and cannot be handled by the usual rubber techniques.

The rubbery copolymers of our invention may alternatively or in addition to any such cross-linking agent, contain small amounts of other monomers which do not essentially change the nature of the butadiene-acrylonitrile rubbery copolymer.

The rubbery butadiene-acrylonitrile copolymer of our invention can be calendered to smooth sheets or extruded to give perfectly smooth shapes, in this respect differing from ordinary butadiene-acrylonitrile rubbery copolymer. The rubbery copolymer of our invention may be compounded with vulcanizing ingredients and other rubber compounding materials and vulcanized in the conventional manner. The resulting vulcanizates have good physical properties and in general display an appreciably higher modulus than similar vulcanizates prepared from ordinary butadiene-acrylonitrile rubbery copolymers. However, it should be pointed out that in the case of those rubbery butadiene-acrylonitrile copolymers of our invention which contain more than about 75% gel, the reinforcement effected by admixture with carbon black is not so pronounced as it is in the case of ordinary butadiene-acrylonitrile rubbery copolymers, the reason for this apparently being that at such high gel levels the carbon black does not reinforce the gel content but overloads the sol portion of the rubber. Apparently the carbon black disperses with difficulty in the gelled phase with the result that it overloads the non-gel portion of the copolymer.

We have found it advantageous to blend the copolymers of our invention with ordinary butadiene-acrylonitrile rubbery copolymers, or with any other rubbery material with which they are compatible. The mixtures thus prepared also have better processability and higher modulus than ordinary butadiene-acrylonitrile rubber.

In a particularly advantageous embodiment of our invention, the rubbery butadiene-acrylonitrile copolymers of our invention may be blended by any suitable method with hard inelastic resinous thermoplastic copolymers to form improved thermoplastic resin-rubber compositions. By the use of our butadiene-acrylonitrile rubbery copolymers in the preparation of such resin-rubber compositions, greatly improved processability and better physical properties are obtained.

The resinous component of such thermoplastic mixtures is a thermoplastic, normally hard, inelastic (i. e., it is non-rubbery and has an elongation of less than 5%) polymer selected from the group consisting of copolymers of a styrene, such as styrene itself, alpha-methyl styrene, para-methyl styrene, alpha-methyl p-methyl styrene, 2-chlorostyrene, 4-chlorostyrene or 2,4-dichlorostyrene, with acrylonitrile; polyvinyl chloride; and copolymers of a major proportion of vinyl chloride with a minor proportion of another copolymerizable monomer, e. g., a copolymer of 85 to 95% vinyl chloride and correspondingly 15 to 5% vinyl acetate, vinylidene chloride or other suitable copolymerizable monomer.

We often prefer to employ hard, inelastic thermoplastic resinous copolymers of monomers consisting essentially of from 50 to 85% by weight of a styrene and correspondingly from 50 to 15% by weight of acrylonitrile. The styrene-acrylonitrile resin has an ultimate elongation of less than 5% and is brittle at room temperature. It can be made by the emulsion polymerization procedure disclosed in U. S. Patent No. 2,140,048, using a large amount of monomeric styrene, e. g. 50 to 85% by weight of the styrene in the binary mix of monomers, the proportion of monomeric acrylonitrile correspondingly ranging from 15 to 50% by weight. In this manner, normally hard, resinous copolymers, which are non-rubbery at room temperatures, are obtainable with corresponding softening points ranging from about 90° C. to about 108° C. Increase in the proportion of acrylonitrile gives an increase in the softening temperature of the resin obtained which in turn provides for a final resin-rubber mixture which is more resistant to deformation at higher temperatures.

In more detail, the thermoplastic hard normally inelastic synthetic resin may be prepared by the emulsion copolymerization of styrene and acrylonitrile as disclosed in U. S. Patent No. 2,140,048, in the presence of an emulsifying agent and a polymerization catalyst. The customary regulators or modifiers used in making GR-A (Buna N) may be included, such as those of the mercaptan or other type. A convenient recipe is:

| | Parts by weight |
|---|---|
| Water | 180-400 |
| Peroxidic catalyst | 0.1-1.5 |
| Styrene | 85-50 |
| Acrylonitrile | 15-50 |
| Emulsifying agent | 0.5-1.50 |
| Modifier | 0-1 |

After the auto clave, which is equipped with a stirrer, is charged with the mixture it is heated with stirring until there has been a 90% or better conversion to the desired copolymer resin. Time and temperature are correlated. The temperatures may range from 80° F. to as high as 200° F.; at 95° F., about 10-14 hours are needed.

The coagulation may be carried out, with stirring, in any of the conventional ways, by acid (e. g., acetic acid), or salt solution, at room temperature or higher; coagulation by heat may also be employed. The coagulate is separated by filtration or otherwise, washed with water and dried to produce a friable powder. The material may also be prepared in resin powder form by spray-drying the synthetic latex. The solid resin at room temperatures, such as 20° C., is lacking in elastic (rubber-like) properties; it can be milled to form a sheet which is hard, tough and brittle at ordinary room temperatures. It has a softening temperature of about 195° F. to about 226° F., varying within these limits according to the combined acrylonitrile content and the degree of completeness to which the polymerization is carried. The white solid or powder is capable of being milled or molded to a hard tough product, softening at from 10 to 25° C. higher than pure polystyrene which has a softening point of about 80° C. The preferred products for use in this invention are those having a combined acrylonitrile content of 20 to 30% and an intrinsic viscosity in dimethylformamide of 1 to 2. As is well-known to those skilled in the art, the relative proportions of styrene and acrylonitrile in the feed determine the percentage of acrylonitrile in the finished polymer. The percentage of acrylonitrile in the finished polymer is not however the same as in the charge. For example, a 50-50 charge will give an acrylonitrile content in the polymer of the order of 45% whereas charging 15% acrylonitrile and 85% styrene will give a polymer having an acrylonitrile content of the order of 12%. Thus, those skilled in the art can readily select a monomeric charge giving a polymer containing 20 to 30% combined acrylonitrile. As to intrinsic viscosity, this is affected by the nature and amount of the modifier used. Increasing the amount of the modifier such as dodecyl mercaptan will effect a decrease in the intrinsic viscosity of the polymer. Thus, one skilled in the art can readily select the modifier and amount thereof to produce a polymer having an intrinsic viscosity within the above limits. Furthermore, several styrene - acrylonitrile resinous copolymers are available commercially and one skilled in the art can by standard methods of analysis select those resins having the preferred acrylonitrile content and intrinsic viscosity set out above.

Other methods of preparing the styrene-acrylonitrile resin, such as bead polymerization and en masse polymerization, may also be used.

Homogeneous intermixture of the hard thermoplastic resin with the butadiene-acrylonitrile rubbery copolymer of our invention is effected on a rubber mill, in a Banbury mixer or by means of any other suitable mixing apparatus.

In the case of those rubbery copolymers of our invention which are made directly by emulsion polymerization and therefore are available in latex form, such latices may be mixed with latices of the resin made by emulsion polymerization, and the resulting mixture subjected to coagulation to give a material which after washing and drying is in the form of a powder which may then be massed or solidified by milling for a short time at an elevated temperature, for example during the admixture of desired pigments, fillers or other ingredients, and may thereafter be given any desired shape.

The relative proportions of the thermoplastic resin and the rubbery copolymer of our invention will generally vary between 25 and 90% by weight of the resinous ingredient and correspondingly from 75 to 10% by weight of the rubbery butadiene-acrylonitrile copolymer, these proportions being based on the sum of the weights of the resinous material and the rubbery copolymer. As the proportion of the hard resin is increased, the hardness and tensile strength of the resultant composition are increased. The mixtures containing from 25 up to 50% by weight of the hard resin result, after vulcanization in the conventional manner, in tough, flexible, leather-like materials which are exceptionally strong and highly resistant to abrasion and scuffing, being from 100 to 500% better than genuine leather in wear tests. In this range of proportions, it is preferred to add vulcanizing agents to the mixture and to vulcanize the resulting blends. The preferred vulcanizing agent is sulfur which should be used in such an amount as would vulcanize the rubbery copolymer to a soft vulcanized state if such rubbery copolymer were cured alone. Generally from ½ to 5 parts of sulfur based on each 100 parts of total resin-rubber mixture are employed. Other vulcanizing ingredients such as vulcanization accelerators, activators, etc. may be employed in addition to the sulfur.

When the hard resin content is increased to values ranging from 50% up to 90%, preferably about 60 to 80%, of the resin-rubber mix, molding compositions result which can be shaped or formed to any desired contour under heat and pressure. The products are hard, tough and horny in contrast to the leather-like compositions containing less than 50% of the hard resin. Those blends which contain from 50% to 80% of the hard resin manifest extremely high toughness and impact resistance. When the resin is used in amounts ranging from 50 to 90% of the resin-blend, it is not necessary to vulcanize the mixture and it is generally preferred not to vulcanize it, in order to permit reutilization of scrap material.

The rubbery butadiene-acrylonitrile copolymer of our invention can be made in many different ways including those set out below.

One method of making the butadiene-acrylonitrile rubbery copolymers of our invention comprises masticating ordinary commercially available rubbery butadiene-acrylonitrile copolymers at a temperature of from 300° F. to 360° F. until the copolymer has the above-specified values for methyl ethyl ketone-insoluble gel content, swelling index of gel in methyl ethyl ketone, and Mooney viscosity at 212° F. This hot mastication may be effected either on an open rubber mill or in a closed internal mixer, especially a Banbury mill. When an open rubber mill is employed, the stock temperature should not be allowed to exceed 340° F., in order to prevent deterioration and scorching. In the Banbury the temperature of the stock can rise as high as 360° F. without injuring it. It is generally not possible by the hot mastication method to build up the methyl ethyl ketone-insoluble gel content of the copolymer to a value in excess of 75%. Accordingly, when gel values in excess of 75% are desired, it is necessary to use other methods such as those described hereafter.

Ordinary commercial rubbery butadiene-acrylonitrile copolymer usually contains from 0 to 20% of methyl ethyl ketone-insoluble gel but this gel is usually mainly or entirely "loose" gel, having an extremely high swelling index in methyl ethyl ketone, and does not serve the purpose served by the content of tight gel required by our invention but on the contrary interferes with processing and smoothness of product.

The changes occurring when ordinary commercially available rubbery butadiene-acrylonitrile copolymer is subjected to hot milling at 300° F. to 340° F. on the open rubber mill to produce one form of rubbery butadiene-acrylonitrile copolymer embraced by our invention, and the changes effected in blends of the transformed rubbery copolymer with styrene-acrylonitrile resinous copolymer, can be more fully understood by reference to Fig. 2 of the accompanying drawings, which illustrates graphically the variations in the Mooney viscosity and the methyl ethyl ketone-insoluble gel content of the rubbery copolymer, and in the swelling index of the methyl ethyl ketone-insoluble gel, with time of hot milling, and which also illustrates the variation in physical properties of the resin-rubber compositions obtained by mixing the thus-milled rubber with a styrene-acrylonitrile resinous copolymer.

In obtaining the data upon which the curves of Fig. 2 are based, a 12-inch laboratory two-roll open rubber mill was employed in milling the rubber component. When a larger, plant-sized two-roll rubber mill is employed for hot mastication of the rubber, the time required to reach a given set of values on the curves is generally substantially lengthened, but the inter-relation of the several values for gel content, gel swelling index, Mooney viscosity and physical properties of the resulting rubber-resin blends remain essentially unchanged.

Referring to Fig. 2, curve 1 shows the variation in Mooney viscosity at 212° F. of Perbunan 35NS90—a commercially available grade of rubbery butadiene-acrylonitrile copolymer which contained about 35% by weight of combined acrylonitrile, which contained essentially no methyl ethyl ketone-insoluble gel, and which had an initial intrinsic viscosity of about 1.8 in dimethyl formamide—with time of hot milling on the aforementioned laboratory rubber mill at a mill roll temperature of 330° F. (after an initial cold milling for 10 minutes interposed to convert nearly all of any loose gel present to soluble form). It will be seen that the Mooney viscosity decreased from an initial value of about 60 to a first minimum value of about 50 during the first ten minutes of hot milling, and that thereafter the Mooney viscosity increased with continued milling to a maximum value of about 83 at 40 minutes' hot milling time. During the period in which the viscosity was rising the rubber became increasingly more rough and coarse. During the same period the methyl ethyl ketone-insoluble gel content increased to a value of about 34% as is shown by curve 2. At this point, as is shown by curve 3, the swelling index of the gel was about 34, having dropped far below the extremely high value found for the small amount of gel which appeared after 20 minutes of hot grinding and which was mainly loose gel. Continued hot milling beyond 40 minutes caused the viscosity of the rubber to drop again, reaching a second minimum at a value of about 53 Mooney at 75 minutes' milling time, while the methyl ethyl ketone-insoluble gel content attained a value of about 65%. If milling is continued beyond this second Mooney minimum, the viscosity of the rubber again rises and the gloss and smoothness of the rubber gradually disappear. The gel content of the rubber increased relatively little after this second minimum of viscosity had been passed. For these reasons there is no advantage in continuing the milling substantially past the second minimum of Mooney viscosity. In order to obtain rubbery copolymers having gel values substantially in excess of those prevailing at the second minimum of viscosity, it is necessary to resort to other methods such as the fractionating method or the emulsion polymerization method described hereinafter.

Considering now the physical properties of the resin-rubber compositions prepared from the rubber after hot milling for various periods of time as previously described in connection with curves 1 to 3 of Fig. 2, we show in curve 4 the variation in tensile strength of a mixture of 30 parts by weight of the rubber with 70 parts by weight of a styrene-acrylonitrile resin prepared from a monomeric charge containing about 70% by weight of styrene and 30% by weight of acrylonitrile. Curve 5 shows the variation in elongation at break of such resin-rubber compositions. It will be seen that, although the initial effect of the hot milling is to decrease the tensile strength and the elongation at break of the blend, continued milling of the rubber component to produce methyl ethyl ketone-insoluble gel contents of at least 40% and Mooney viscosities in the range of falling values beyond the point of maximum viscosity, which values are attained concomitantly with gel swelling indices of 34 or less in the particular case under discussion, unexpectedly produces in the resin-rubber mixtures a marked increase in elongation at break from a low value of about 18 to an optimum value of 85 and simultaneously a marked improvement in tensile strength from an initial low value of 4300 p. s. i. to an optimum value of 5700 p. s. i.

As previously indicated, instead of using an open rubber mill to convert ordinary commercially available butadiene-acrylonitrile rubbery copolymers to the form of our invention, we may use a closed internal mixer, especially a Banbury mixer. We have found that when such an internal type of mixer is used for masticating the rubbery copolymer to cause it to assume the characteristics specified herein, the curves of methyl ethyl ketone-insoluble gel content and of swelling index plotted against milling time show substantially the same relationship and follow substantially the same paths as for the open rubber mill, but the curve for Mooney viscosity plotted against milling time does not exhibit the two minima obtained when the open rubber mill is used for the hot milling. On the contrary the Mooney viscosity decreases throughout the milling, finally approaching or attaining a value identical with that obtained at the second Mooney minimum with the open rubber mill. These statements are substantiated by Fig. 3 of the drawing which shows the effect of carrying out the hot milling in a 3A Banbury mixer. The charge to the Banbury was 140 pounds and the temperature of the stock ranged from 330° F. to 360° F. The hot grinding was continued for 125 minutes. Periodically withdrawn samples of the rubbery copolymer were blended with a styrene-acrylonitrile resin (made from 70% styrene and 30% acrylonitrile) in the proportions of 35 parts of the rubber and 65 parts of the resin. It will be seen that the Banbury-masticated butadiene-acrylonitrile rubbery copolymer is substantially equivalent to that which was obtained by hot-milling on the open rubber mill, in methyl ethyl ketone-insoluble gel content, swelling index of gel, and Mooney viscosity, and that the physical properties of the resulting rubber-resin blends are substantially equivalent to those of blends made with rubbery copolymers which have been made by hot mastication on the open rubber mill. The processing characteristics of the two types of rubbery copolymers, i. e., that made on the open rubber mill and that made in the Banbury, were equivalent.

It will be understood that the curves of Figs. 2 and 3 are based upon two specific sets of conditions and that while, because of the many variables involved including the particular rubbery copolymer employed, the size of charge, size of mill, temperature maintained, etc., exact reproduction of these curves in a duplication of the runs is quite unlikely, nevertheless these curves do portray general trends which would be obtained in such duplication. Thus, although Figs. 2 and 3 are indicative of the variation of the several properties portrayed with time of hot milling, they are given merely to illustrate the invention and are not to be taken in any way as limiting the invention.

As previously indicated, rubbery butadiene-acrylonitrile copolymers containing more than 75% of methyl ethyl ketone-insoluble gel having a swelling index of not over 35 in methyl ethyl ketone generally cannot be made by hot milling either on the open rubber mill or in a Banbury mixer. We have found however that one way of preparing such copolymers having in excess of 75% of such methyl ethyl ketone-insoluble gel and having a Mooney viscosity within our limits involves extracting rubbery copolymers, which have been hot milled to a suitable content of such methyl ethyl ketone-insoluble gel and to a suitable Mooney viscosity, with a suitable solvent for the sol portion of the rubber, such as methyl ethyl ketone, leaving an insoluble residue of rubber containing up to 100% methyl ethyl ketone-insoluble gel, depending upon the degree of completeness of the extraction process.

Another way of making rubbery butadiene-acrylonitrile copolymers falling within the scope of our invention comprises carrying the emulsion polymerization of butadiene and acrylonitrile to extremely high conversions, namely in excess of 80%, subjecting the resulting latex to a heat-softening process by adding thereto a few per cent of a heat-softening agent such as phenyl beta-naphthylamine, digesting the resulting latex for several hours at an elevated temperature, coagulating the latex, washing and drying the coagulum and then subjecting the resulting rubbery copolymer to hot-milling at 300° F. to 340° F. on the open rubber mill or at 300° F. to 360° F. in an internal mixer, such as a Banbury mixer, to bring the Mooney viscosity into our range. In this way the butadiene-acrylonitrile copolymer is converted to the form in which it has the methyl ethyl ketone-insoluble gel content, gel swelling index and Mooney viscosity of the product contemplated by our invention. If butadiene and acrylonitrile are copolymerized in emulsion to high conversion and the resulting latex is coagulated, the resulting rubber has a gel content within the range specified by us, but it has an excessively high Mooney viscosity, and even though it be subjected to such hot milling, it will still be too high in Mooney viscosity, and it manifests excessive roughness and is not satisfactory. However, if the heat-softening process described is performed on the latex, and the dried coagulum is subjected to hot milling in accordance with the teachings of this specification, there is obtained a product which has all the desirable properties discovered by us.

Still another method of making butadiene-acrylonitrile rubbery copolymers having the values of methyl ethyl ketone-insoluble gel content, gel swelling index and Mooney viscosity specified by our invention, comprises carrying the emulsion polymerization of butadiene and acrylonitrile to high conversion, i. e., in excess of 80%, blending the resulting latex in suitable proportions with a latex of butadiene-acrylonitrile rubbery copolymer having a methyl ethyl ketone-insoluble gel content of zero and an extremely low Mooney viscosity, coagulating the mixed latices, washing and drying.

Yet another way of making the butadiene-acrylonitrile rubbery copolymer of our invention comprises subjecting butadiene and acrylonitrile to emulsion polymerization in the presence of a suitable amount of a cross-linking agent of which divinyl benzene is a typical example. The amount of the cross-linking agent employed and the other conditions of the emulsion polymerization can easily be adjusted in the light of this specification and particularly in the light of Example 11 below, so as to produce a copolymer product having the values for gel content, gel swelling index and Mooney viscosity specified by us. More specifically, the amount of such cross-linking agent should, in general, range from 0.75 to 2.0% by weight based on the weight of other monomers present, viz., butadiene and acrylonitrile. The polymerization should be conducted in the presence of a suitable amount of a modifier, especially one of the mercaptan type. When the teachings of Schoene 2,474,807 are employed to make butadiene-acrylonitrile rubbery copolymers, the product does not have the properties of our copolymer but is deficient in one or more respects and it is necessary to depart from the teachings of Schoene by increasing the amount of cross-linking agent to substantially above the upper limit specified by Schoene in order to produce a product having the properties specified by us.

It has been found further that when a cross-linking agent, such as divinyl benzene, is added at the start of the emulsion polymerization, the product obtained usually contains from about 90 to 100% methyl ethyl ketone-insoluble gel having a swelling index of not over 35. It is a serious limitation of this method that it cannot be controlled so as to give values for such gel content above 40% and materially below 90%. This limits the flexibility of the procedure. If it is desired to make a rubbery copolymer having such a gel content, it is necessary to mix the product with a low-gel rubbery butadiene-acrylonitrile copolymer. Such a method may be deemed undesirable because of the complication involved. Furthermore, when the cross-linking agent is added initially, the process tends to give erratic results. It has been found that these disadvantages can be overcome and that a copolymer having any desired gel content between 40 and 80% and otherwise conforming to our invention can be consistently produced by initiating the emulsion polymerization of the butadiene and acrylonitrile in the absence of the cross-linking agent and, after copolymerization has proceeded to a certain predetermined extent, say 25 to 50% conversion, adding the cross-linking agent and continuing the copolymerization to the desired extent of conversion. This delayed addition of the cross-linking agent is the subject of copending application of Hendrik Romeyn, Jr. and Charles D. McCleary, Serial No. 192,828, filed October 28, 1950.

When the rubbery copolymer of our invention is made by emulsion polymerization in the presence of a cross-linking agent, we use the same relative proportions of butadiene and acrylonitrile in the monomer charge that would yield a rubbery copolymer if the cross-linking agent were not used. Commonly we employ relative proportions of butadiene and acrylonitrile giving a product containing from 15 to 45% of bound acrylonitrile and correspondingly from 85 to 55% of bound butadiene, disregarding the few per cent of bound cross-linking agent.

All percentages and parts specified herein are by weight.

The following examples are given to illustrate the invention.

Example 1

A commercial grade of butadiene-acrylonitrile copolymer (known as "Paracril 35NS90") containing about 35% by weight of combined acrylonitrile was milled for 10 minutes on a cold open rubber mill (125° F.). The appearance of the material at this stage was extremely coarse and lumpy and the material was totally unsuitable for calendering or extrusion operations. The temperature of the mill rolls was then increased to 330° F. and the material was hot milled at this temperature for 75 minutes. After this treatment, the rubbery copolymer could be milled to a perfectly smooth uniform sheet and could be readily extruded to form smooth shaped articles. The following table summarizes the properties of the butadiene-acrylonitrile copolymer before and after treatment:

|  | Untreated | Hot Milled |
|---|---|---|
| Minutes on Cold Mill (125° F.) | 0 | 10 |
| Minutes on Hot Mill (330° F.) | 0 | 75 |
| Methyl Ethyl Ketone-Insoluble Gel Content, percent | 0 | 65 |
| Swelling Index of Gel, Measured in MEK |  | 12 |
| Mooney Viscosity (212° F.) | 88 | 54 |
| Appearance of Milled Sheet | rough | smooth |

The gel content and swelling index were determined in peroxide-free methyl ethyl ketone as explaind previously.

Portions of the untreated and the hot-milled synthetic rubber copolymer were compounded according to the following formulation, and after vulcanization for various times the physical properties were as indicated in the table below:

| | Parts by weight |
|---|---|
| Butadiene-acrylonitrile copolymer | 100 |
| Zinc oxide | 5 |
| Stearic acid | 1.5 |
| Benzothiazyl disulfide | 1.25 |
| Sulfur | 2 |
| Wyex (carbon black) | 100 |
| Coal tar (plasticizer) | 40 |

| | Untreated | Hot Milled |
|---|---|---|
| Cured 30' at 287° F.: | | |
| Tensile, p. s. i | 2,100 | 2,100 |
| Stress at 200% elongation, p. s. i | 1,100 | 1,450 |
| Elongation at break, percent | 530 | 300 |
| Cured 60' at 287° F.: | | |
| Tensile, p. s. i | 2,050 | 2,050 |
| Stress at 200% elongation, p. s. i | 1,150 | 1,500 |
| Elongation at break, percent | 475 | 275 |
| Cured 120' at 287° F.: | | |
| Tensile, p. s. i | 2,200 | 2,700 |
| Stress at 200% elongation, p. s. i | 1,400 | 2,300 |
| Elongation at break, percent | 430 | 255 |

From the above data it is seen that the vulcanizate derived from the rubbery copolymer hot-milled according to the present invention has good physical properties, and exhibits an appreciably higher modulus than the vulcanizate obtained from the untreated elastomer, a desirable characteristic in certain applications.

Example 2

Portions of the untreated and the hot milled rubbery butadiene-acrylonitrile copolymer obtained in Example 1 were mixed (unvulcanized) with a resinous styrene-acrylonitrile copolymer derived from a monomer charge containing about 70% by weight of styrene and 30% of acrylonitrile. The weight proportion of rubber to resin in the mixtures was 30 to 70. The mixtures were prepared by banding the thermoplastic resin on a mill at 300–320° F., then adding the rubber and blending thoroughly at the same temperature (10–12 minutes' total milling time). The appearance of the mixture prepared from the untreated rubber was very rough, with relatively high shrinkage. In contrast to this the hot milled rubber-resin mixture of this invention was quite smooth and glossy, with substantially less shrinkage. The physical properties of the two rubber-resin mixtures were as follows:

|  | Rubber-Resin Mixtures Prepared From— | |
|---|---|---|
|  | Untreated Rubber | Hot Milled Rubber |
| Tensile strength, p. s. i | 4,500 | 5,600 |
| Elongation at break, percent | 23 | 85 |

The improvement in physical properties of the mixture prepared from the rubber hot milled according to this invention is evident from these data.

When samples of rubber-resin mixtures prepared from the treated and the untreated rubber and containing vulcanizing agents are vulcanized in the conventional manner, similar improvements in physical properties are observed.

*Example 3*

In this example, we used a commercial butadiene-acrylonitrile rubbery copolymer of the type known as "Paracril 26NS60" which contained about 26% of combined acrylonitrile and as received had the following characteristics:

| | |
|---|---|
| Mooney viscosity at 212° F | 56 |
| MEK-insoluble gel content, percent | 0 |
| Swelling index of gel in MEK | -- |
| Appearance on mill | Rough |

After hot milling on the open rubber mill at 300°–330° F. to the first minimum in the Mooney viscosity curve, the copolymer has the following characteristics:

| | |
|---|---|
| Mooney viscosity at 212° F | 46 |
| MEK-insoluble gel content, percent | 0 |
| Swelling index of gel in MEK | -- |
| Appearance on mill | Smooth |

After continued hot milling in the same manner to the maximum in the Mooney viscosity curve, the copolymer has the following characteristics:

| | |
|---|---|
| Mooney viscosity at 212° F | 52 |
| MEK-insoluble gel content, percent | 31 |
| Swelling index of gel in MEK | 30 |
| Appearance on mill | Rough |

Upon continuing hot milling in the same way to the second minimum in the Mooney viscosity curve, the copolymer has the following characteristics:

| | |
|---|---|
| Mooney viscosity at 212° F | 45 |
| MEK-insoluble gel content, percent | 55 |
| Swelling index of gel in MEK | 18 |
| Appearance on mill | Smooth |

Thirty parts of the copolymer which has been milled to the second minimum are blended with 70 parts by weight of a styrene-acrylonitrile resinous copolymer (containing 26% of bound acrylonitrile) to a uniform homogeneous mixture, which is then sheeted and plied up in the usual way. The product has the following physical properties:

| | |
|---|---|
| Tensile, p. s. i | 4070 |
| Impact, Izod notched at 25° C | 10.4 |
| Impact, Izod notched at −20° C | 4.1 |
| Hardness, Rockwell, L Scale | 45 |
| Appearance of mixture on mill | Smooth |

It is noteworthy that a Mooney viscosity of 56 (the value that the rubber used in this example had initially) is about as low as practical for a commercial elastomer, since a lower initial Mooney in ordinary butadiene-acrylonitrile rubber would result in impaired physical properties as well as difficulties in storage and shipping (due to the great tendency to consolidate and flow together). Nevertheless, the hot milled product made by this example and having a Mooney of 45 exhibits greatly improved properties and can be satisfactorily shipped, stored and handled.

*Examples 4 to 6*

Example 3 was duplicated exactly except that three different lots of commercial butadiene-acrylonitrile rubbery copolymer known as "Paracril 35NS90" were used. The copolymers contained around 35% of bound acrylonitrile. The following data were obtained.

| Example No | 4 | 5 | 6 |
|---|---|---|---|
| Tests on Rubber as Received: | | | |
| Mooney viscosity at 212° F | 80 | 93 | 105 |
| MEK-insoluble gel Content, per cent | 0 | 0 | 0 |
| Gel Swelling Index (in MEK) | | | |
| Appearance on Mill | rough | rough | rough |
| Tests on Rubber after Hot Milling on 2-roll Mill at 300°–330° F. to first minimum in Mooney curve: | | | |
| Mooney viscosity at 212° F | 52 | 60 | 91 |
| MEK-insoluble Gel Content, per cent | 0 | 4 | 0 |
| Gel Swelling Index (in MEK) | | 350 | |
| Appearance on Mill | smooth | slightly rough | rough |
| Tests on Rubber After Continuing Hot Milling to maximum in Mooney curve: | | | |
| Mooney viscosity at 212° F | 83 | 80 | 115 |
| MEK-insoluble Gel, per cent | 31 | 43 | 41 |
| Gel Swelling Index (in MEK) | 36 | 24 | 21 |
| Appearance on Mill | rough | rough | rough |
| Tests on Rubber after Continuing Hot Milling to second minimum in Mooney curve: | | | |
| Mooney viscosity at 212° F | 53 | 49 | 75 |
| MEK-insoluble Gel, per cent | 63 | 68 | 65 |
| Gel swelling Index (in MEK) | 12 | 16 | 9 |
| Appearance on Mill | smooth | smooth | smooth |
| Tests on Blend of Rubber Milled to Second Low Mooney with Styrene-Acrylonitrile Resin (containing 26 per cent bound acrylonitrile) in ratio of 30 parts rubber and 70 parts resin: | | | |
| Tensile, p. s. i | | 5,010 | |
| Impact, Izod notched: | | | |
| at 25° C | | 14.0 | |
| at −20° C | | 1.3 | |
| Appearance of Mixture on Mill | | smooth | |

Example 7

The commercial butadiene-acrylonitrile rubbery copolymer known as Paracril 35NS90 was ground in a 3A Banbury mixer at 330°–360° F. for 125 minutes. The initial Mooney viscosity was 88. The charge was 140 pounds. The mastication at elevated temperature caused a progressive building up of MEK-insoluble gel content with a concurrent decrease both in the swelling index of this gel and in the sol viscosity (intrinsic viscosity of MEK-soluble portion), in these respects duplicating hot milling on the rubber mill.

However, we noted one significant difference, namely, the non-sinusoidal variation or logarithmic decrease in the Mooney viscosity which occurred in the Banbury.

Thirty-five part samples of the rubber were withdrawn at intervals and blended with 65 parts of a styrene-acrylonitrile resin containing 26% of bound acrylonitrile, and the physical properties of the resulting mixtures were determined. The data on the rubber and the mixtures were as follows:

|  | Sample A | Sample B | Sample C | Sample D | Sample E |
|---|---|---|---|---|---|
| Time of Grinding Rubber at 330°–360° F. in Banbury—(minutes) | 0 | 28 | 60 | 93 | 125 |
| Properties of Rubber: |  |  |  |  |  |
| MEK-insoluble Gel, per cent | 7.2 | 21 | 37 | 41 | 47 |
| Gel Swelling Index, in MEK | 216 | 52 | 25 | 16 | 16 |
| Viscosity of Sol | 1.37 | 0.94 | 0.81 | 0.78 | 0.76 |
| Mooney viscosity of Rubber at 212° F. | 88 | 82 | 60 | -------- | 60 |
| Physical Properties of 65/35 Resin-Rubber Mixtures: |  |  |  |  |  |
| Tensile, p. s. i. | 3,170 | 3,680 | 4,220 | 4,330 | 4,320 |
| Elongation, per cent | 61 | 50 | 69 | 80 | 91 |
| Impact, Izod Notched: |  |  |  |  |  |
| at Room Temperature | 15.1 | 15.4 | 15.0 | 14.6 | 14.4 |
| at −20° C | 0.75 | 0.87 | 0.88 | 0.85 | 1.15 |
| Rockwell Hardness, L Scale | 50 | 58 | 63 | 63 | 66 |

It will be seen that, as mastication is continued, the resin-rubber mixtures show a gradual increase in tensile strength, elongation at break, and hardness. Room temperature notched impact strength remains substantially constant at a maximum value.

Example 8

In this example we first milled the commercial copolymer known as Paracril 35NS90 on a two-roll rubber mill at temperatures ranging from 300° to 330° F. until its viscosity had attained the second minimum. The milled rubber then was subjected to extraction with methyl ethyl ketone. The resulting extract was evaporated to remove the solvent and leave the sol portion of the rubber. Samples of the insoluble gel fraction, the sol fraction, and hot milled rubber before extraction were examined and were blended as before, in a 35/65 ratio with a styrene-acrylonitrile resin containing 26% of bound acrylonitrile. The data are as follows:

|  | Hot Milled Rubber | MEK-Insoluble Gel Fraction of Hot Milled Rubber | Sol Fraction of Hot Milled Rubber |
|---|---|---|---|
| Tests on Rubber: |  |  |  |
| Mooney viscosity at 212° F | 50 | 76 |  |
| MEK-Insoluble Gel, per cent | 50 | 100 | 0 |
| Gel Swelling Index | 20 | 20 |  |
| Appearance on Mill | smooth | smooth | Too soft to mill |
| Tests on Resin-Rubber Mixtures: |  |  |  |
| Tensile strength, p. s. i. | 4,460 | 4,520 | 2,120 |
| Izod notched impact, ft. lbs./in.: |  |  |  |
| at 25° C | 11.9 | 10.0 | 9.1 |
| at −20° C | 1.2 | 2.5 | 1.8 |
| Rockwell Hardness, L Scale | 39 | 44 | 18 |
| Appearance of Milled Sheet | smooth | smooth | very smooth |

This example shows that while the hot milled rubber was an excellent material and gave an excellent resin-rubber mixture, yet, if desired, the gel content thereof could be increased up to 100% by partial or complete fractionation by solvent extraction.

Example 9

This example illustrates a method of attaining the results of the present invention by subjecting a butadiene and acrylonitrile emulsion copolymer latex to heat softening, followed by hot milling of the recovered rubber. Into a ten-gallon stainless steel autoclave were charged the following materials:

| | |
|---|---|
| Butadiene | 65 |
| Acrylonitrile | 35 |
| Mixed tertiary mercaptans | 0.10 |
| Lauryl mercaptan | 0.10 |
| Tertiary hexadecyl mercaptan | 0.10 |
| Potassium peroxy disulfate | 0.50 |
| Diamyl sulfosuccinate | 5.0 |
| Water | 200 |

Polymerization was effected by maintaining the internal temperature of the autoclave at 50° C.

for 36 hours. After the first 21 hours of reaction, further quantities of mercaptans and persulfate were added, in amounts equal to the amounts originally charged. At 36 hours the reaction was short-stopped by the addition of 0.6 part of hydroquinone. The total solids content was found to be 25.8%, corresponding to 85% conversion. One-half of the latex was protected from oxidation by the addition of 1.0 part of 2,6-ditertiary butyl-p-cresol, and the rubber was then flocced, washed, and dried in a vacuum oven. The rubber thus obtained had a very high Mooney viscosity as shown in the table below. The other half of the latex was stripped of unreacted acrylonitrile by vacuum at 40° C., and was then subjected to a heat treatment in order to reduce the viscosity of the rubber therein. To 100 parts of the latex were added 2.0 parts of diamyl sulfosuccinate, and 3 parts of phenyl-beta-naphthylamine. This latex was then heated in an autoclave for 8 hours at 130° C. while an air pressure of 80 to 100 p. s. i. was maintained over the liquid in the autoclave. The rubber in the thus treated latex was then recovered in the manner described above. The regular emulsion copolymer rubber and the heat softened copolymer rubber thus produced were then hot milled on an open roll mill at 300° to 330° F. as indicated in the following table, which also shows the physical properties of the rubber at various stages, as well as tests on blends of the rubber with styrene-acrylonitrile resin.

data also show that hot milling this material did not improve it, since the Mooney rose still higher (to 152) and then went down (to 96) but the product was still unsatisfactory even though it had a high gel content (74). The data show that in contrasts the copolymer which had been heat-softened in latex form was readily converted by hot milling to a form exhibiting the desirable characteristics discovered by us. The heat-softening of the copolymer in latex form lowered the Mooney from 131 to 92 and otherwise changed the copolymer so that upon hot milling it was changed into a smooth processing material.

*Example 10*

In this example, two rubbery butadiene-acrylonitrile copolymer latices were taken. One latex (A) had been carried in the polymerizer to extremely high conversion so that the copolymer had an extremely high Mooney (over 150) and a high gel content. The other latex (B) contained copolymer of extremely low Mooney and zero gel content. These two latices were blended and coagulated, the rubbery copolymer contained therein being washed and dried in the usual way. The relative proportions in which the two latices were blended were such that the coagulum contained 70% of the copolymer from the A latex and 30% from the B latex. This coagulum is designated C hereinafter. Samples of the coagula from the A and B latices and of the

|  | Run A (Regular Emulsion Copolymer) | Run B (Heat-Softened Emulsion Copolymer) |
|---|---|---|
| Test on Initial Copolymer: |  |  |
| Mooney Viscosity at 212° F | 131 | 92 |
| MEK-Insoluble Gel, Per cent | 56 | 41 |
| Gel Swelling Index (in MEK) | 27 | 34 |
| Appearance on Mill | very rough | rough |
| Tests on Copolymer After Hot Milling on Open Mill at 300°-330° F. to Mooney maximum: |  |  |
| Mooney viscosity at 212° F | 152 | 102 |
| MEK-Insoluble Gel, Per cent | 45 | 25 |
| Gel Swelling Index (in MEK) | 11 | 21 |
| Appearance on Mill | very rough | rough |
| Tests on Copolymer after Continued Hot Milling to Second minimum in Mooney Curve: |  |  |
| Mooney viscosity at 212° F | 96 | 57 |
| MEK-Insoluble Gel, Per cent | 74 | 52 |
| Swelling Index | 11 | 18 |
| Appearance on Mill | rough | smooth |
| Tests on 70/30 Resin-Rubber Mix Using Styrene-acrylonitrile Resin (26% acrylonitrile) and using Rubber which had been milled to second low Mooney: |  |  |
| Tensile, p. s. i | 5,180 | 4,980 |
| Impact, Izod notched: |  |  |
| at 25° C | 13.7 | 11.7 |
| at −20° C |  | 1.6 |
| Hardness, L Scale |  |  |
| Appearance on Mill | rough | smooth |

The data show that the Mooney viscosity of the un-heat-softened copolymer was much too high (131) and although the gel content was high (56) and the gel swelling index low (27), nevertheless it was not a satisfactory product. The coagulum from the mixed latices (designated C) were examined. Samples of A and C were blended in a 35/65 ratio with a styrene-acrylonitrile resin containing 26% of bound acrylonitrile. The data are as follows:

|  | A | B | C |
|---|---|---|---|
| Tests on Rubber Copolymer: |  |  |  |
| Mooney viscosity at 212° F | greater than 150 | less than 10 | 64 |
| MEK-Insoluble Gel, percent | 89 | 0 | 52 |
| Gel Swelling Index (in MEK) | 16 |  | 17 |
| Percent Bound Acrylonitrile | 33 | 33 | 33 |
| Appearance on Mill | very rough | too soft to mill | smooth |
| Tests on Rubber-Resin Mixtures: |  |  |  |
| Tensile strength, p. s. i | 4,370 |  | 4,310 |
| Izod Notched Impact Strength (ft. lbs./in.): |  |  |  |
| at 25° C | 10.0 |  | 11.2 |
| at −20° C | 1.0 |  | 1.4 |
| Appearance of Milled Sheet | very rough |  | smooth |

This example shows that one way of obtaining rubbery butadiene-acrylonitrile copolymers responding to our invention comprises admixing a latex of a rubbery butadiene-acrylonitrile copolymer which has too high a Mooney viscosity with a latex of such a copolymer having too low a Mooney viscosity and too low a gel content, coagulating the resulting mixture and solidifying or compacting the resulting coagulum in the conventional manner.

polymer containing 24 to 26% bound acrylonitrile in proportions of 35 parts of rubbery copolymer with 65 parts of resin gave mixtures which were very satisfactory.

The data are as follows:

| Run | Polymers Within Schoene Patent | | | | | | Polymer Within Present Invention |
|---|---|---|---|---|---|---|---|
| | A | B | C | D | E | F | G |
| Polymerization Variables: | | | | | | | |
| Divinyl Benzene | 0.1 | 0.1 | 0.1 | 0.5 | 0.5 | 0.5 | 1.0 |
| Dodecyl Mercaptan | | | | 0.6 | 0.8 | 1.2 | 0.8 |
| Mixed Tertiary Mercaptans | 0.6 | 1.0 | 1.4 | | | | |
| Per Cent Conversion of Monomers | 84 | 84 | 85 | 86 | 83 | 89 | 85 |
| Acrylonitrile Content of Rubbery Copolymer | 31.6 | 35.5 | 33.0 | 32.6 | 36.0 | 34.8 | 29.9 |
| Physical Tests on Rubbery Polymer After Milling for 3 Min. at 320° F: | | | | | | | |
| Mooney viscosity at 212° F | 110 | 115 | 54 | 150 | 150 | 118 | 66 |
| MEK-Insoluble Gel Content, Per Cent | 75 | 67 | 0 | 89 | 90 | 95 | 89 |
| Gel Swelling Index (in MEK) | 22 | 19 | | 10 | 17 | 9 | 17 |
| Processing | rough | rough | rough, tacky | smooth | smooth | smooth | smooth |
| Physical Tests of 65/35 Resin-Rubber Mixture: | | | | | | | |
| Tensile strength | 4,140 | 4,110 | 2,260 | 4,030 | 4,510 | 4,420 | 4,030 |
| Flexural strength | 6,300 | 5,860 | 3,740 | 7,000 | 6,980 | 6,930 | 6,110 |
| Flexural Modulus | 206,000 | 252,000 | 143,000 | 208,000 | 218,000 | 204,000 | 199,000 |
| Hardness, Rockwell L | 42 | 44 | 5 | 48 | 52 | 52 | 35 |
| Impact, Izod Notched at: | | | | | | | |
| 25° C | 16.0 | 15.9 | 16.4 | 4.9 | 1.5 | 0.8 | 12.0 |
| −20° C | 2.6 | 1.1 | 3.0 | 1.2 | 0.8 | 0.8 | 1.1 |
| Processing of Mixed Stock | rough | rough | rough, tacky | smooth | smooth | smooth | smooth |

At this point it may be stated that, when conventional practice in making butadiene-acrylonitrile rubbery copolymers is followed, copolymers having a Mooney viscosity higher than about 105 are obtained only by carrying the polymerization to very high conversion, with the concurrent formation of substantial amounts of tight gel during the final stages. However, such a product is of little value unless it is processed as indicated in Example 9 or Example 10, either by heat-softening in the latex form or by blending with a low Mooney, non-gelled rubbery copolymer.

*Example 11*

In this example, butadiene and acrylonitrile in the proportions commonly used to make rubbery copolymers thereof were subjected to emulsion polymerization in the presence of divinyl benzene as a cross-linking agent. Six runs, namely runs A, B, C, D, E and F, were carried out following the teachings of Schoene Patent 2,474,807. In runs A, B and C 0.1% of divinyl benzene (based upon the monomer charge) was used, while in runs D, E and F 0.5% of divinyl benzene was used. The type and amount of mercaptan modifier used were varied. However, the product obtained was in every case deficient in one or more respects. Thus, runs A, B, D, E and F all gave a product having too high a Mooney viscosity, even though the product of runs D, E and F was smooth-processing. The product of run C contained no tight gel.

In another run, designated G, which was outside the teachings of the Schoene patent, the amount of divinyl benzene was increased to 1.0%. Unlike runs A to F, run G gave a product which had the characteristics specified by our invention and was smooth in processing and when mixed with a styrene-acrylonitrile resinous co- It should be pointed out that runs D, E and F, in which the divinyl benzene was raised to the upper limit specified in the Schoene patent, gave products having excessively high Mooney viscosity, even though the gel content and gel swelling index were within the ranges specified by our invention. Products having such high Mooney viscosity are definitely unsatisfactory. It will also be noted that the resin-rubber blends made with these rubbery copolymers were decidedly deficient in impact strength at room temperature.

*Example 12*

Into a 10-gallon stainless steel autoclave were charged 946 g. of a 28.5% paste of commercial sodium cetyl sulfate (3 parts) dissolved in 11,940 ml. (140 parts total) of deionized water. Then 3920 ml. (35 parts) of acrylonitrile were added, followed by 105 ml. (1.00 part) of tertiary dodecyl mercaptan and 23.9 ml. of 71.9% cumene hydroperoxide solution (0.20 part). Finally, 5850 g. (65 parts) of butadiene were added. The internal temperature of the autoclave was raised to 40° C. Samples of the reaction mixture were removed at hourly intervals and the total solids content was measured. At 6.5 hours, 15.8% total solids content (28% conversion) was reached; 224 ml. of a 44% solution of divinylbenzene (1.0 part) were charged to the autoclave, and the polymerization was continued. At 17 hours (total) 34.3% total solids content was reached (74% conversion). The batch was cooled and excess butadiene was vented. The latex was withdrawn into glass vessels and 180 ml. of a 10% emulsion of dinitrochlorobenzene (0.2 part) was added to the latex as a shortstop. The latex was transferred to a tank equipped with a stirrer, and 90 g. (1.0 part) of 2,6-di-tert.-butyl-p-cresol in alcohol were added as an antioxidant. A solution of $CaCl_2$ was added to flocculate the latex to a crumb. The crumb was washed several times, then dried at 60° C. in a vacuum oven. The Mooney viscosity of the polymer was 47. The polymer contained 30.4% of combined acrylonitrile. Analysis showed the presence of 62% of gel with a swelling index of 32, measured in methyl ethyl ketone. The intrinsic viscosity of the soluble fraction was 0.57, measured in the same solvent.

*Shrinkage data*

Tests were conducted in order to determine the relationship between the tight gel content of the rubbery copolymer of our invention and the properties of the ultimate product, particularly the shrinkage characteristics. In this series of determinations, we used three types of butadiene-acrylonitrile rubbery copolymer. Copolymer A was a sample of the commercial material known as Paracril 35NS90. Sample B was the same as sample A but had been milled at 300° to 340° F. on the open rubber mill until it had reached the second Mooney minimum, at which point it had an MEK-insoluble gel content of 48%, a Mooney viscosity at 212° F. of 51 and a gel swelling index of 20, and smooth processing characteristics. Sample C was a sample of copolymer made by run G of Example 11, namely a butadiene-acrylonitrile copolymer cross-linked during emulsion polymerization by the use of more divinyl benzene than is contemplated in the Schoene patent mentioned above. Each of these three samples was banded on the two-roll rubber mill and a length of 20.8 inches (which was equal to the circumference of the roll) was cut off after good banding had been attained. These lengths were then allowed to cool while in a relaxed state. The length of the cooled strip was measured and from this the percent of shrinkage was calculated. The data were as follows:

| | MEK-insol. Gel Content, Per cent | Length of Banded Sample | | Shrinkage | |
|---|---|---|---|---|---|
| | | On Mill, inches | Relaxed, inches | inches | Per cent |
| Sample A—Paracril 35NS90 As Received | 0 | 20.8 | 6.9 | 13.9 | 66 |
| Sample B—Paracril 35NS90 Hot-milled to second Mooney minimum | 48 | 20.8 | 13.5 | 7.3 | 35 |
| Sample C—Divinyl benzene Cross-linked copolymer having a Mooney of 66 and an MEK-insoluble Gel Content of 89, Gel Swelling Index 17 | 89 | 20.8 | 17.5 | 3.3 | 16 |

From the foregoing it will be seen that our invention provides a new and highly advantageous form of rubbery butadiene-acrylonitrile copolymer which not only processes much more easily but upon admixture with thermoplastic resins gives products having greatly improved physical characteristics. Such rubber-resin compositions manifest higher tensile and elongation and are free from the surface roughness which has been a serious defect in resin-rubber blends of this type as heretofore made. Numerous other advantages of our invention will be apparent from the foregoing description.

This application is a continuation-in-part of our copending application Serial No. 59,664, filed November 12, 1948, now abandoned.

Having thus described our invention, what we claim and desire to protect by Letters Patent is:

1. A composition of matter comprising a normally elastic rubbery butadiene-acrylonitrile copolymer having a combined acrylonitrile content of from 15 to 45% by weight and having by itself and in the unvulcanized state a methyl ethyl ketone-insoluble gel content of from 40 to 100% by weight, said gel having a swelling index of from 8 to 35 in methyl ethyl ketone and being incapable of conversion to a soluble state by milling, said copolymer having by itself and in the unvulcanized state a Mooney viscosity at 212° F. of from 40 to 80, and a normally inelastic thermoplastic resin selected from the group consisting of polyvinyl chloride, copolymers containing a major proportion of vinyl chloride and a minor proportion of a copolymerizable monomer, and copolymers of a major proportion of a styrene selected from the group consisting of styrene, alpha-methyl styrene, para-methyl styrene, alpha-methyl para-methyl styrene and nuclearly chlorinated styrenes and a minor proportion of acrylonitrile, said thermoplastic resin comprising from 25 to 90% by weight and said rubbery copolymer correspondingly comprising from 75 to 10%, said last-named percentages being based on the sum of the weights of said rubbery copolymer and said resin.

2. A composite thermoplastic homogeneous mixture of a normally elastic rubbery butadiene-acrylonitrile copolymer having a combined acrylonitrile content of from 15 to 45% and having by itself and in the unvulcanized state a methyl ethyl ketone-insoluble gel content of from 50 to 75% by weight, said gel having a swelling index of from 10 to 25 in methyl ethyl ketone and being incapable of conversion to a soluble state by milling, said copolymer having by itself and in the unvulcanized state a Mooney viscosity at 212° F. of from 45 to 75, and a normally inelastic thermoplastic resin selected from the group consisting of polyvinyl chloride, copolymers containing a major proportion of vinyl chloride and a minor proportion of a copolymerizable monomer, and copolymers of a major proportion of a styrene selected from the group consisting of styrene, alpha-methyl styrene, para-methyl styrene, alpha-methyl para-methyl styrene and nuclearly chlorinated styrenes and a minor proportion of acrylonitrile, said thermoplastic resin comprising from 25 to 90% by weight and said rubbery copolymer correspondingly comprising from 75 to 10% of the rubber-resin mixture.

3. A composite thermoplastic homogeneous mixture of a normally elastic rubbery butadiene-acrylonitrile copolymer having a combined acrylonitrile content of from 15 to 45% by weight and having by itself and in the unvulcanized state a methyl ethyl ketone-insoluble gel content of from 40 to 100% by weight, said gel having a swelling index of from 8 to 35 in methyl ethyl ketone and being incapable of conversion to a soluble state by milling, said copolymer having by itself and in the unvulcanized state a Mooney viscosity at 212° F. of from 40 to 80, and a hard normally inelastic resinous thermoplastic copolymer of a major proportion of styrene and a minor proportion of acrylonitrile, said thermoplastic resin comprising from 25 to 90% by weight and said rubbery copolymer correspondingly comprising from 75 to 10% of the rubber-resin mixture.

4. A composition of matter comprising a normally elastic rubbery butadiene-acrylonitrile copolymer having a combined acrylonitrile content of from 15 to 45% by weight and having by itself and in the unvulcanized state a methyl ethyl ketone-insoluble gel content of from 50 to 75% by weight, said gel having a swelling index of from 10 to 25 in methyl ethyl ketone and being incapable of conversion to a soluble state by milling, said copolymer having by itself and in the unvulcanized state a Mooney viscosity at 212° F. of from 45 to 75, and a hard normally inelastic resinous thermoplastic copolymer of a major proportion of styrene and a minor proportion of acrylonitrile, said thermoplastic resin comprising from 25 to 90% by weight and said rubbery copolymer correspondingly comprising from 75 to 10%, said last-named percentages being based on the sum of the weights of said rubbery and resinous copolymers.

5. A hard, tough, thermoplastic homogeneous mixture of a normally elastic rubbery butadiene-acrylonitrile copolymer having a combined acrylonitrile content of from 15 to 45% by weight and having by itself and in the unvulcanized state a methyl ethyl ketone-insoluble gel content of from 40 to 100% by weight, said gel having a swelling index of from 8 to 35 in methyl ethyl ketone and being incapable of conversion to a soluble state by milling, said copolymer having by itself and in the unvulcanized state a Mooney viscosity at 212° F. of from 40 to 80, and a hard normally inelastic resinous thermoplastic copolymer of a major proportion of styrene and a minor proportion of acrylonitrile, said thermoplastic resin comprising from 50 to 90% by weight and said rubbery copolymer correspondingly comprising from 50 to 10% of the rubber-resin mixture.

6. A hard, tough, thermoplastic homogeneous mixture of a normally elastic rubbery butadiene-acrylonitrile copolymer having a combined acrylonitrile content of from 15 to 45% by weight and having by itself and in the unvulcanized state a methyl ethyl ketone-insoluble gel content of from 50 to 75% by weight, said gel having a swelling index of from 10 to 25 in methyl ethyl ketone and being incapable of conversion to a soluble state by milling, said copolymer having by itself and in the unvulcanized state a Mooney viscosity at 212° F. of from 45 to 75, and a hard normally inelastic resinous thermoplastic copolymer of a major proportion of styrene and a minor proportion of acrylonitrile, said thermoplastic resin comprising from 50 to 90% by weight and said rubbery copolymer correspondingly comprising from 50 to 10% of the rubber-resin mixture.

7. The process which comprises milling a normally elastic rubbery butadiene-acrylonitrile copolymer containing from 20 to 45% by weight of combined acrylonitrile at a temperature of from 300° F. to 360° F. until it has a methyl ethyl ketone-insoluble gel content of at least 40% by weight, said gel having a swelling index of from 8 to 35 in methyl ethyl ketone and being incapable of conversion to a soluble state by milling, and until said copolymer has a Mooney viscosity at 212° F. of from 40 to 80.

8. The process which comprises milling a normally elastic rubbery butadiene-acrylonitrile copolymer containing from 20 to 45% by weight of combined acrylonitrile at a temperature of from 300° F. to 360° F. until said copolymer has a methyl ethyl ketone-insoluble gel content of from 50 to 75% by weight, said gel having a swelling index of from 10 to 25 in methyl ethyl ketone and being incapable of conversion to a soluble state by milling, and until said copolymer has a Mooney viscosity at 212° F. of from 45 to 75.

9. The process which comprises milling a normally elastic rubbery butadiene-acrylonitrile copolymer containing from 20 to 45% by weight of combined acrylonitrile on an open rubber mill at a mill temperature of from 300° F. to 340° F. until said copolymer has a methyl ethyl ketone-insoluble gel content of from 50 to 75% by weight, said gel having a swelling index of from 10 to 25 in methyl ethyl ketone and being incapable of conversion to a soluble state by milling, and until said copolymer has a Mooney viscosity at 212° F. of from 45 to 75.

10. The process which comprises milling a normally elastic rubbery butadiene-acrylonitrile copolymer containing from 20 to 45% by weight of combined acrylonitrile on an open rubber mill at a mill temperature of from 300° F. to 340° F. until the Mooney viscosity of said copolymer at 212° F. has increased to a maximum value and thereafter has decreased to a value lower than said maximum value and within the range of from 45 to 75 and there has been, simultaneously with the attainment of said lower Mooney viscosity value, built up in said copolymer a methyl ethyl ketone-insoluble gel content of from 50 to 75% by weight, said gel having a swelling index of from 10 to 25 in methyl ethyl ketone.

11. The process which comprises milling a normally elastic rubbery butadiene-acrylonitrile copolymer containing from 20 to 45% by weight of combined acrylonitrile at a temperature of from 300° F to 360° F. until it has a methyl ethyl ketone-insoluble gel content of at least 40% by weight, said gel having a swelling index of from 8 to 35 in methyl ethyl ketone and being incapable of conversion to a soluble state by milling, and until said copolymer has a Mooney viscosity at 212° F. of from 40 to 80, and combining the resulting rubbery copolymer with a normally inelastic thermoplastic resin selected from the group consisting of polyvinyl chloride, copolymers containing a major proportion of vinyl chloride and a minor proportion of a copolymerizable monomer, and copolymers of a major proportion of a styrene selected from the group consisting of styrene, alpha-methyl styrene, para-methyl styrene, alpha-methyl para-methyl styrene and nuclearly chlorinated styrenes and a minor proportion of acrylonitrile, said thermoplastic resin comprising from 25 to 90% by weight and said rubbery copolymer correspondingly comprising from 75 to 10% of the rubber-resin mixture.

12. The process which comprises milling a normally elastic rubbery butadiene-acrylonitrile copolymer containing from 20 to 45% by weight of combined acrylonitrile at a temperature of from 300° F to 360° F. until it has a methyl ethyl ketone-insoluble gel content of at least 40% by weight, said gel having a swelling index of from 8 to 35 in methyl ethyl ketone and being incapable of conversion to a soluble state by milling, and until said copolymer has a Mooney viscosity at 212° F. of from 40 to 80, and combining the resulting rubbery copolymer with a hard normally inelastic resinous theremoplastic copolymer of a major proportion of styrene and a minor proportion of acrylonitrile, said thermoplastic resin comprising from 25 to 90% by weight and said rubbery copolymer correspondingly comprising from 75 to 10% of the rubber-resin mixture.

13. The process which comprises milling a normally elastic rubbery butadiene-acrylonitrile copolymer containing from 20 to 45% by weight of combined acrylonitrile at a temperature of from 300° F. to 360° F. until said copolymer has a methyl ethyl ketone-insoluble gel content of from 50 to 75% by weight, said gel having a swelling index of from 10 to 25 in methyl ethyl ketone and being incapable of conversion to a soluble state by milling, and until said copolymer has a Mooney viscosity at 212° F. of from 45 to 75, and combining the resulting rubbery copolymer with a normally inelastic thermoplastic resin selected from the group consisting of polyvinyl chloride, copolymers containing a major proportion of vinyl chloride and a minor proportion of a copolymerizable monomer, and copolymers of a major proportion of a styrene selected from the group consisting of styrene, alpha-methyl styrene, para-methyl styrene, alpha-methyl paramethyl styrene and nuclearly chlorinated styrenes and a minor proportion of acrylonitrile, said thermoplastic resin comprising from 25 to 90% by weight and said rubbery copolymer correspondingly comprising from 75 to 10% of the rubber-resin mixture.

14. The process which comprises milling a normally elastic rubbery butadiene-acrylonitrile copolymer containing from 20 to 45% by weight of combined acrylonitrile at a temperature of from 300° F. to 360° F. until said copolymer has a methyl ethyl ketone-insoluble gel content of from 50 to 75% by weight, said gel having a swelling index of from 10 to 25 in methyl ethyl ketone and being incapable of conversion to a soluble state by milling, and until said copolymer has a Mooney viscosity at 212° F. of from 45 to 75, and combining the resulting rubbery copolymer with a hard normally inelastic resinous thermoplastic copolymer of a major proportion of styrene and and a minor proportion of acrylonitrile, said thermoplastic resin comprising from 25 to 90% by weight and said rubbery copolymer correspondingly comprising from 75 to 10% of the rubber-resin mixture.

15. The process of making a hard, tough, thermoplastic rubber-resin mixture which comprises milling at a temperature of 300° to 340° F. a normally elastic rubbery butadiene-acrylonitrile copolymer of from 20 to 45% by weight of combined acrylonitrile until it has a methyl ethyl ketone-insoluble gel content of 50 to 75% by weight and a viscosity of 45 to 75 Mooney at 212° F., said gel having a swelling index in methyl ethyl ketone of 10 to 25 and being incapable of conversion to a soluble state by milling, and combining the resulting rubbery copolymer with a hard normally inelastic resinous thermoplastic copolymer of from 70 to 80% by weight of styrene and correspondingly from 30 to 20% of acrylonitrile and having an intrinsic viscosity of 1 to 2 in dimethylformamide said thermoplastic resin comprising from 50 to 90% by weight and said rubbery copolymer correspondingly comprising from 50 to 10% of the rubber-resin mixture.

HENDRIK ROMEYN, Jr.
JOHN F. PETRAS.

REFERENCES CITED

The following references are of record in the file of this patent:

UNITED STATES PATENTS

| Number | Name | Date |
|---|---|---|
| 2,378,717 | Macey | June 19, 1945 |
| 2,457,097 | Te Grotenhuis | Dec. 21, 1948 |
| 2,474,807 | Schoene | July 5, 1949 |
| 2,500,983 | Frolich et al. | Mar. 21, 1950 |
| 2,505,349 | Daly | Apr. 25, 1950 |
| 2,550,139 | Daly | Mar. 24, 1951 |

OTHER REFERENCES

Young et al.: Ind. and Eng. Chem., vol. 39, pp. 1446–1452, November 1947.